(12) United States Patent
Wang et al.

(10) Patent No.: US 10,945,029 B2
(45) Date of Patent: Mar. 9, 2021

(54) VIDEO FRAME RENDERING CRITERIA FOR VIDEO TELEPHONY SERVICE

(71) Applicant: QUALCOMM Incorporated, San Diego, CA (US)

(72) Inventors: Min Wang, San Diego, CA (US); Shankar Ganesh Lakshmanaswamy, Bangalore (IN); Sandeep Padubidri Ramamurthy, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/428,565

(22) Filed: May 31, 2019

(65) Prior Publication Data

US 2020/0382832 A1    Dec. 3, 2020

(51) Int. Cl.
*H04N 21/44* (2011.01)
*H04L 29/06* (2006.01)
*H04N 21/434* (2011.01)

(52) U.S. Cl.
CPC .......... *H04N 21/44* (2013.01); *H04L 65/604* (2013.01); *H04L 65/80* (2013.01); *H04N 21/4343* (2013.01)

(58) Field of Classification Search
CPC ................. H04N 21/434; H04N 21/44; H04N 21/44004; H04N 21/440245; H04N 21/440281; H04N 21/4425
See application file for complete search history.

(56) References Cited

U.S. PATENT DOCUMENTS

| | | | |
|---|---|---|---|
| 2002/0131510 A1* | 9/2002 | Lin | H04N 19/65 375/240.27 |
| 2004/0258151 A1* | 12/2004 | Spampinato | H04N 19/68 375/240.03 |
| 2005/0175084 A1* | 8/2005 | Honda | H04N 21/6582 375/240.01 |
| 2006/0262864 A1* | 11/2006 | Shi | H04N 19/132 375/240.27 |
| 2008/0159410 A1* | 7/2008 | Perinkulam | H04N 19/89 375/240.27 |
| 2010/0061446 A1* | 3/2010 | Hands | H04N 19/115 375/240.02 |
| 2012/0079329 A1* | 3/2012 | Steinbach | H04N 19/188 714/704 |
| 2014/0211860 A1* | 7/2014 | Zhao | H04N 19/895 375/240.27 |

(Continued)

*Primary Examiner* — Pankaj Kumar
*Assistant Examiner* — Timothy R Newlin
(74) *Attorney, Agent, or Firm* — Holland & Hart LLP

(57) ABSTRACT

Methods, systems, and devices for video frame rendering are described. A device, such as a user equipment (UE) may receive a set of video packets over a video connection (e.g., a video telephony service) and generate a set of video frames based on the set of video packets. The device may determine to render a video frame of the set of video frames based on a frame type of the video frame or a rendering criteria including a video quality of the video frame, or both. In some examples, the frame type may include a perfect frame or a corrupted frame. The device may render the video frame of the set of video frames based on the frame type of the video frame or the video frame satisfying the rendering criteria, or both, and output the rendered video frame for display.

20 Claims, 10 Drawing Sheets

(56) References Cited

U.S. PATENT DOCUMENTS

2014/0314321 A1* 10/2014 Gu .................. H04N 17/004
   382/190
2016/0192296 A1* 6/2016 Rehan ............... H04N 21/6373
   455/574
2016/0309182 A1* 10/2016 Koren .............. H04N 21/25891

* cited by examiner

VIDEO FRAME RENDERING CRITERIA FOR VIDEO TELEPHONY SERVICE

BACKGROUND

Communications systems are widely deployed to provide various types of communication content such as voice, video, packet data, messaging, broadcast, and so on. In video telephony communications, a transmitting device may compress (e.g., encode) camera captured video frames to compressed video frames and packetize the compressed video frames into video packets and transmit the packets over a packet-switched (PS) network. A receiving device may perform depacketizing on received video packets, reassembly to produce to the compressed video frames, and decoding on the compressed video frames to reproduce the video frames and display the video frames. In some examples, video packets may be dropped or corrupted during transmission due to, for example, radio link variations, network congestion conditions, etc. As a result, some video frames may not be transmitted correctly or timely received at a receiving device for rendering. Some communications systems including, for example, a receiving device may attempt to address these issues via spatial error concealment schemes, however, the receiving device lacks capability to track video frame error propagation.

SUMMARY

The described techniques relate to improved methods, systems, devices, and apparatuses that support video frame rendering criteria for video telephony service. Generally, the described techniques support video compression and packetizing schemes, packet transmission, depacketizing, reassembly and decoding schemes to reproduce and render video frames. In some examples, the described techniques may include generating video frames from video packets received in a video stream and applying criteria to determine which video frames to render, for example, to display at a device. Accordingly, the described methods, systems, devices, and apparatuses include video decoding and post-processing techniques that provide one or more of spatial and temporal error concealment capabilities, as well as tracking capabilities of error propagation.

A method of video frame rendering at a device is described. The method may include receiving a set of video packets over a video connection, generating a set of video frames based on the set of video packets, determining to render a video frame of the set of video frames based on a frame type of the video frame or a rendering criteria including a video quality of the video frame, or both, where the frame type includes a perfect frame or a corrupted frame, rendering the video frame of the set of video frames based on the frame type of the video frame or the video frame satisfying the rendering criteria, or both, and outputting the rendered video frame for display.

An apparatus for video frame rendering is described. The apparatus may include a processor, memory in electronic communication with the processor, and instructions stored in the memory. The instructions may be executable by the processor to cause the apparatus to receive a set of video packets over a video connection, generate a set of video frames based on the set of video packets, determine to render a video frame of the set of video frames based on a frame type of the video frame or a rendering criteria including a video quality of the video frame, or both, where the frame type includes a perfect frame or a corrupted frame, render the video frame of the set of video frames based on the frame type of the video frame or the video frame satisfying the rendering criteria, or both, and output the rendered video frame for display.

Another apparatus for video frame rendering is described. The apparatus may include means for receiving a set of video packets over a video connection, generating a set of video frames based on the set of video packets, determining to render a video frame of the set of video frames based on a frame type of the video frame or a rendering criteria including a video quality of the video frame, or both, where the frame type includes a perfect frame or a corrupted frame, rendering the video frame of the set of video frames based on the frame type of the video frame or the video frame satisfying the rendering criteria, or both, and outputting the rendered video frame for display.

A non-transitory computer-readable medium storing code for video frame rendering at a device is described. The code may include instructions executable by a processor to receive a set of video packets over a video connection, generate a set of video frames based on the set of video packets, determine to render a video frame of the set of video frames based on a frame type of the video frame or a rendering criteria including a video quality of the video frame, or both, where the frame type includes a perfect frame or a corrupted frame, render the video frame of the set of video frames based on the frame type of the video frame or the video frame satisfying the rendering criteria, or both, and output the rendered video frame for display.

In some examples of the method, apparatuses, and non-transitory computer-readable medium described herein, determining to render the video frame of the set of video frames may include operations, features, means, or instructions for determining a video quality degradation threshold value, where rendering the video frame of the set of video frames may be further based on the video quality degradation threshold value.

In some examples of the method, apparatuses, and non-transitory computer-readable medium described herein, the video quality degradation threshold value includes a threshold range.

Some examples of the method, apparatuses, and non-transitory computer-readable medium described herein may further include operations, features, means, or instructions for dynamically configuring the video quality degradation threshold value based on a user preference.

Some examples of the method, apparatuses, and non-transitory computer-readable medium described herein may further include operations, features, means, or instructions for identifying a priority of the video quality of the set of video frames based on the user preference, and where dynamically configuring the video quality degradation threshold value may be further based on the priority of the video quality.

In some examples of the method, apparatuses, and non-transitory computer-readable medium described herein, determining to render the video frame of the set of video frames may include operations, features, means, or instructions for comparing the video quality of the video frame of the set of video frames to the video quality degradation threshold value, determining that the video quality of the video frame of the set of video frames satisfies the video quality degradation threshold value, and where rendering the video frame of the set of video frames may be further based on the video quality of the video frame of the set of video frames satisfying the video quality degradation threshold value.

In some examples of the method, apparatuses, and non-transitory computer-readable medium described herein, determining to render the video frame of the set of video frames may include operations, features, means, or instructions for determining an estimated video quality of the video frame of the set of video frames based on a macroblock concealment value of the video frame of the set of video frames.

In some examples of the method, apparatuses, and non-transitory computer-readable medium described herein, determining to render the video frame of the set of video frames may include operations, features, means, or instructions for determining that the estimated video quality of the video frame of the set of video frames satisfies the video quality degradation threshold value, and where rendering the video frame of the set of video frames may be further based on the estimated video quality of the video frame of the set of video frames satisfying the video quality degradation threshold value.

In some examples of the method, apparatuses, and non-transitory computer-readable medium described herein, determining to render the video frame of the set of video frames may include operations, features, means, or instructions for determining that the estimated video quality of the video frame of the set of video frames fails to satisfy the video quality degradation threshold value, and where rendering the video frame of the set of video frames includes refraining from rendering the video frame of the set of video frames based on the estimated video quality of the video frame of the set of video frames failing to satisfy the video quality degradation threshold value.

In some examples of the method, apparatuses, and non-transitory computer-readable medium described herein, refraining from rendering the video frame of the set of video frames may include operations, features, means, or instructions for refraining from rendering the video frame of the set of video frames until receiving a subsequent frame including an instantaneous decoder refresh frame or an error recovery predicted frame with or without carrying a recovery point supplemental enhancement information message.

In some examples of the method, apparatuses, and non-transitory computer-readable medium described herein, the video frame of the set of video frames may be packetized according to a real-time transport protocol.

In some examples of the method, apparatuses, and non-transitory computer-readable medium described herein, the macroblock concealment value may be based on the video frame of the set of video frames being packetized according to the real-time transport protocol.

In some examples of the method, apparatuses, and non-transitory computer-readable medium described herein, determining to render the video frame of the set of video frames may include operations, features, means, or instructions for determining the video frame of the set of video frames includes one or more of an instantaneous decoder refresh frame or an error recovery predicted frame, determining an estimated video quality of the video frame of the set of video frames based on a macroblock concealment value associated with the video frame, determining that the estimated video quality of the video frame of the set of video frames satisfies the video quality degradation threshold value, and where rendering the video frame of the set of video frames may be further based on the estimated video quality of the video frame of the set of video frames satisfying the video quality degradation threshold value.

In some examples of the method, apparatuses, and non-transitory computer-readable medium described herein, determining to render the video frame of the set of video frames may include operations, features, means, or instructions for determining the video frame of the set of video frames includes a predicted frame, determining an estimated video quality of the video frame of the set of video frames based on an estimated video quality of a preceding video frame to the video frame of the set of video frames and a macroblock concealment value associated with the video frame, determining that the estimated video quality of the video frame of the set of video frames satisfies the video quality degradation threshold value, and where rendering the video frame of the set of video frames may be further based on the estimated video quality of the video frame of the set of video frames satisfying the video quality degradation threshold value.

Some examples of the method, apparatuses, and non-transitory computer-readable medium described herein may further include operations, features, means, or instructions for determining a weighting factor to apply to the estimated video quality of the preceding video frame based on a frame rate of the set of video frames, applying the weighting factor to the estimated video quality of the preceding video frame, and where determining the estimated video quality of the video frame of the set of video frames may be further based on applying the weighting factor to the estimated video quality of the preceding video frame.

In some examples of the method, apparatuses, and non-transitory computer-readable medium described herein, determining to render the video frame of the set of video frames may include operations, features, means, or instructions for determining the video frame of the set of video frames includes a predicted frame except for an error recovery predicted frame with or without carrying a recovery point supplemental enhancement information message as an indication, determining an estimated video quality of the video frame of the set of video frames based at least in part on an estimated video quality of a preceding video frame to the video frame of the set of video frames and a macroblock concealment value associated with the video frame, and determining that the estimated video quality of the video frame of the set of video frames fails to satisfy the video quality degradation threshold value, where rendering the video frame of the set of video frames includes refraining from rendering the video frame of the set of video frames or one or more video frames subsequent to the video frame based at least in part on the estimated video quality of the video frame of the set of video frames failing to satisfy the video quality degradation threshold value.

In some examples of the method, apparatuses, and non-transitory computer-readable medium described herein, determining to render the video frame of the set of video frames may include operations, features, means, or instructions for determining the video frame of the set of video frames includes an instantaneous decoder refresh frame or an error recovery predicted frame with or without carrying a recovery point supplemental enhancement information message as an indication, determining an estimated video quality of the video frame of the set of video frames based at least in part on a macroblock concealment value associated with the video frame, and determining that the estimated video quality of the video frame of the set of video frames fails to satisfy the video quality degradation threshold value, where rendering the video frame of the set of video frames includes refraining from rendering the video frame of the set of video frames or one or more video frames subsequent to the video frame based at least in part on the estimated video quality of the video frame of the set of video frames failing to satisfy the video quality degradation threshold value.

In some examples of the method, apparatuses, and non-transitory computer-readable medium described herein, refraining from rendering the video frame of the set of video frames may include operations, features, means, or instructions for refraining from rendering the video frame of the set of video frames or the one or more video frames subsequent to the video frame until receiving a subsequent frame including an instantaneous decoder refresh frame or an error recovery predicted frame with or without carrying a recovery point supplemental enhancement information message as an indication.

DETAILED DESCRIPTION

Figure 1:
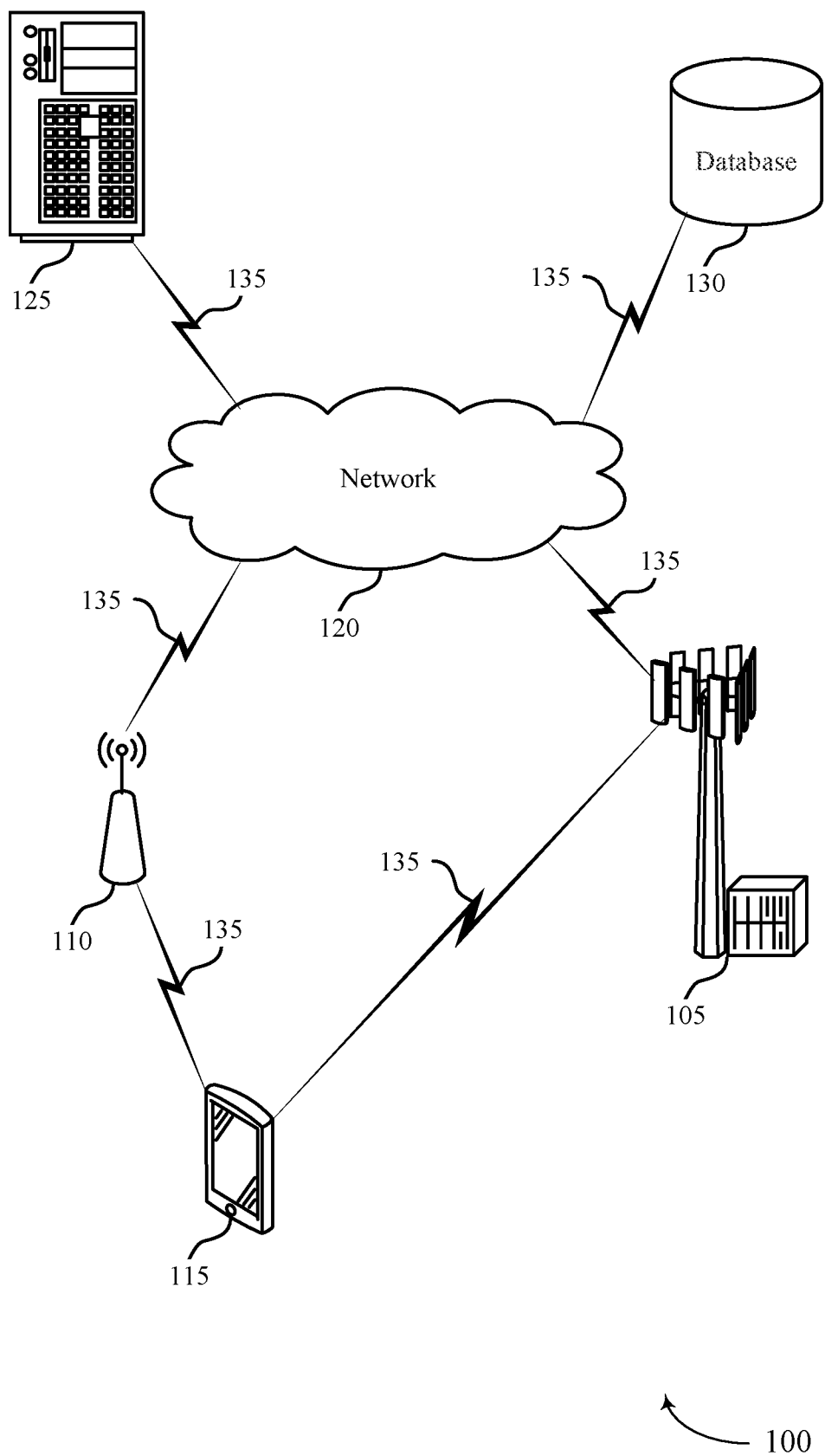
FIG. 1 illustrates an example of a system for video frame rendering that supports video frame rendering criteria for video telephony service in accordance with aspects of the present disclosure.

Some communication systems may have devices that support communications according to one or more radio access technologies, for example, a wireless local area network (WLAN), such as a Wi-Fi network, a fourth generation (4G) system such as Long Term Evolution (LTE) systems, LTE-Advanced (LTE-A) systems, or LTE-A Pro systems, and a fifth generation (5G) system which may be referred to as a New Radio (NR) systems. Some communications systems may support various types of communication, such as voice, video, packet data, and so on. For example, some communications systems may support video telephony communications between devices over a wired or a wireless packet-switched (PS). As part of the video telephony communications, a device may receive one or more video packets and generate one or more video frames from the video packets. The device may render one or more of the generated video frames based on a comparison between a quality degradation of each of the video frames and a video quality degradation threshold value.

By way of example, the device may determine that the quality degradation of the video frame is below the video quality degradation threshold value, and accordingly determine to render the video frame. In some examples, the video quality degradation threshold value may be pre-configured or may be dynamically configured during the video telephone call. The dynamic configuration of the video quality degradation threshold value may be user controlled, for example, during the video telephone call based on user preferences indicating desired image quality or video smoothness. In some examples, the device may be unable to determine a video quality (e.g., a quality degradation). In these examples, the device may support schemes for estimating the quality of the video frames according to error concealment information (e.g., a macroblock concealment value).

The device may determine an estimated video quality of a video frame according to a frame type, which may include a perfect frame or a corrupted frame. A perfect frame is a reproduced video frame at the receiving device which may be identical to its corresponding video frame decoded with the encoder output at the transmitting device. That is, a perfect video frame may be an error free frame. A corrupted frame or a non-perfect frame may be a reproduced video frame at the receiving device which has one or more errors in relation to its corresponding video frame decoded with the encoder output at the transmitting device. Sources of the errors may include packet loss in the received frame, bit error(s) in the received frame, and/or error(s) in a reference frame(s) if the video frame is a predicted frame). In some examples, when a video frame is an instantaneous decoder refresh frame or an error recovery predicted frame, the device may estimate the quality of the video frame as being the macroblock concealment value of the video frame. In some examples, when a current video frame is a predicted frame other than an error recovery predicted frame, the device may estimate the quality of the current video frame based on an estimated video quality of a preceding video frame and a macroblock concealment value associated with the current video frame, as well as a weighting factor. In other examples, if all the real-time transport protocol packets of a video frame are lost, the device may set the macroblock concealment value of the video frame to a certain value (e.g., 100 percent).

Particular aspects of the subject matter described in this disclosure may be implemented to realize one or more of the following potential advantages. The described improved methods, systems, devices, and apparatuses may support improved rendering of video frames for video telephone services based on a frame type (e.g., a perfect frame or a corrupted frame). Supported video frame rendering may include rendering all (partially or fully) received video frames regardless of video quality, rendering perfect video frames (e.g., non-corrupted video frames or video frames without error), and rendering a combination of perfect frame, as well as non-perfect (e.g., corrupted) frames having a video quality degradation value below video quality degradation threshold value. The described techniques may also support flexibility in video rendering and resource usage.

Aspects of the disclosure are initially described in the context of a system. Aspects of the disclosure are further described in the context of one or more additional systems and one or more rendering schemes that relate to aspects of video telephony communications over wireless networks. Aspects of the disclosure are further illustrated by and described with reference to apparatus diagrams, system diagrams, and flowcharts that relate to video frame rendering criteria for video telephony service.

FIG. 1 illustrates an example of a system 100 that supports video frame rendering criteria for video telephony service in accordance with aspects of the present disclosure. The system 100 may include a base station 105, an access point 110, a device 115, a server 125, and a database 130. The base station 105, the access point 110, the device 115, the server 125, and the database 130 may communicate with each other via network 120 using communications links 135 to support video telephony service related operations.

The base station 105 may wirelessly communicate with the device 115 via one or more base station antennas. Base station 105 described herein may include or may be referred to by those skilled in the art as a base transceiver station, a radio base station, a radio transceiver, a NodeB, an eNodeB (eNB), a next-generation Node B or giga-NodeB (either of which may be referred to as a gNB), a Home NodeB, a Home eNodeB, or some other suitable terminology. The device 115 described herein may be able to communicate with various types of base stations and network equipment including macro eNBs, small cell eNBs, gNBs, relay base stations, and the like. The access point 110 may be configured to provide wireless communications for the device 115 over a relatively smaller area compared to the base station 105.

In some examples, the device 115 may be stationary and/or mobile. In further examples, the device 115 may include a cellular phone, a smartphone, a personal digital assistant (PDA), a wireless communication device, a hand-held device, a tablet computer, a laptop computer, a cordless phone, a display device (e.g., monitors), and/or the like. The device 115 may, additionally or alternatively, include or be referred to by those skilled in the art as a device, a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the device 115 may also be able to communicate directly with another device (e.g., using a peer-to-peer (P2P) or device-to-device (D2D) protocol). In some cases, the device 115 may establish a video connection with another device (not shown) (e.g., another device 115) for a video telephone call over a wired or wireless packet-switched (PS) network such as a cable system, a 4G system, or a 5G system.

In some examples, the device 115 may compress (e.g., encode) and packetize video frames and transmit the packets over a wireless packet-switched (PS) network. In other examples, the device 115 may perform depacketizing, reassembly and decoding on one or more packets transmitted by another device (e.g., in communication with the device 115) over the wireless PS network to reproduce video frames and display the video frames. In some examples, video packets may be dropped or corrupted during transmission due to, for example, radio link variations, network congestion conditions, etc. As a result, some video frames may not be transmitted correctly or timely received at the device 115 for rendering. In some examples, the device 115 may generate video frames from video packets received in a video stream and apply criteria to determine which video frames to render, for example, to display. In applying criteria to determine which video frames to render, the device 115 may estimate the quality of the video frames according to error concealment information (e.g., a macroblock concealment value). Accordingly, the device 115 may perform video decoding/post-processing that provide one or more of spatial and temporal error concealment capabilities, as well as tracking capabilities of error propagation.

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G) for example), etc. Network 120 may include the Internet.

The server 125 may include any combination of a data server, a cloud server, a server associated with an automation service provider, proxy server, mail server, web server, application server, database server, communications server, home server, mobile server, or any combination thereof. The server 125 may also transmit to the device 115 a variety of information, such as instructions or commands (e.g., configuration information) relevant to supporting video telephony service related operations. Server 125 may include an application distribution platform. For example, the device 115 may upload or download applications such as messaging applications for video communications. In another example, the device 115 may download a messaging application from the server 125. The messaging application may provide video enhancements, video restoration, video analysis, video compression, and video synthesis. For example, the device 115 may provide video enhancements, video restoration, video analysis, video compression, and video synthesis for video frame rendering criteria in video telephony service.

The database 130 may store data that may include instructions or commands (e.g., configuration information) relevant to supporting video telephony service related operations. The device 115 may retrieve the stored data from the database 130 via the base station 105 and/or the access point 110. For example, upon receiving a request to provide a configuration file to device 115, server 125 may parse and retrieve the configuration file, from the database 130, based on the information provided in the request (e.g., configuration identifier, operating system type (e.g., Linux, Unix, Mac OS X, Windows, etc.) of device 115) and provide the configuration file to the device 115 via the communications links 135. The device 115 may receive the configuration file and apply it to a video telephony service related operation.

The communications links 135 shown in the system 100 may include uplink transmissions from the device 115 to the base station 105, the access point 110, or the server 125, and/or downlink transmissions, from the base station 105, the access point 110, the server 125, and/or the database 130 to the device 115. The downlink transmissions may also be called forward link transmissions while the uplink transmissions may also be called reverse link transmissions. The communications links 135 may transmit bidirectional communications and/or unidirectional communications. The communications links 135 may include one or more connections, including but not limited to, 345 MHz, Wi-Fi, Bluetooth, Bluetooth low-energy (BLE), cellular, Z-WAVE, 802.11, peer-to-peer, LAN, wireless local area network (WLAN), wireless wide area network (WWAN), Ethernet, FireWire, fiber optic, and/or other connection types related to communication systems. In some examples, the communications links 135 may include universal mobile telecommunications service (UMTS) connections (e.g., third generation (3G) system connections), 4G system connections such as LTE systems, LTE-A systems, or LTE-A Pro systems, and 5G system connections, and/or other connection types related to these communication systems.

Accordingly, the techniques described herein may provide improvements in video frame rendering related operations, and more specifically may provide a device 115 capable of rendering video frames based on frame type, rendering criteria including video quality of video frames, or both.

Figure 2:
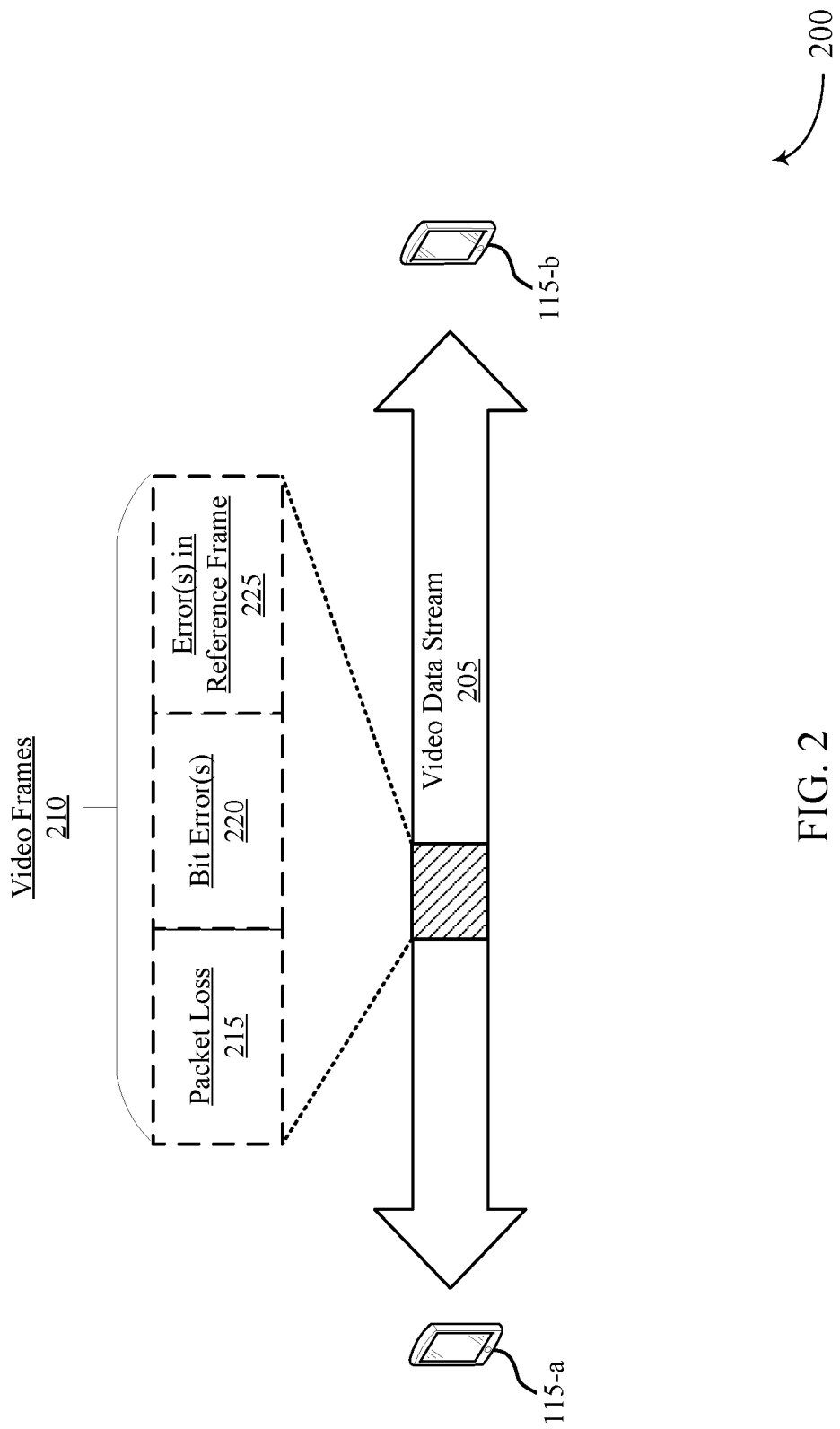
FIG. 2 illustrates an example of a system for video frame rendering that supports video frame rendering criteria for video telephony service in accordance with aspects of the present disclosure.

FIG. 2 illustrates an example of a system 200 for video frame rendering that supports video frame rendering criteria for video telephony service in accordance with aspects of the present disclosure. The system 200 may implement aspects of system 100, such as providing improvements to video frame rendering. For example, the system 200 may include a device 115-a and a device 115-b, which may be examples of devices 115 as described with reference to FIG. 1.

The device 115-a may establish a video connection with the device 115-b for a video telephone call over a network, for example, such as 4G systems, 5G systems, WiFi systems, and the like. The video connection may be a bi-directional connection between the device 115-a and the device 115-b. During the video telephone call, the device 115-a may capture video, encode (e.g., compress) video frames of the captured video, packetize the encoded video frames, and transmit a resultant video data stream 205 including the video frames (e.g., video frames 210) to the device 115-b, for example, over the video connection. The device 115-b may receive the video data stream 205 (e.g., a set of video packets) and generate a set of video frames from the video data stream 205 (e.g., reconstruct video frames 210 from the set of video packets, for example, through depacketizing, reassembly and decoding). In some examples, the device 115-b may determine whether to render a video frame of the video frames 210 according to a frame type of the video frame or a rendering criteria, or both. Thus, the device 115-b may render the video frame of the video frames 210 based on the determination, for example, of a frame type or a video quality of the video frame. The device 115-b may output the rendered video frames for display at the device 115-b.

In some examples, the device 115-b may evaluate a video frame of the set of video frames (e.g., received via video data stream 205 and generated by the device 115-b) based on a frame type or a video quality of the video frame. For example, the device 115-b may classify or refer to a video frame having no error as a perfect frame (e.g., a video frame without any error) and classify or refer to a video frame having one or more errors (some error) as a corrupted video frame (e.g., a video frame having some error). The device 115-b may further determine the video quality of the video frame of the set of video frames based on one or more rendering criteria. For example, the device 115-b may determine a video quality of each corrupted frame based on a video degradation (e.g., a video quality degradation value).

Sources of error or degradation for a video frame may include, for example, packet loss and/or bit error(s) in the video frame, and/or error(s) in its reference frame(s) (e.g., error(s) in a reference frame(s), even when all packets and all the bits for a current frame are correctly received). In the example of a video telephony call, a reference frame may also be a preceding frame of the video frame. Further, in an example where the video frame is an instantaneous decoder refresh frame, the video frame may be encoded with no reference frame. In some examples, sources of error for the video frames 210 may include packet loss 215, bit error(s) 220, and/or error(s) in reference frame 225. In some examples, the device 115-b may be able to determine a video quality for a video frame of the set of video frames. Here, the device 115-b may support the ability to estimate the video quality of a video frame of the set of video frames using error concealment information. For example, the device 115-b may depacketize and reassemble video packets included in the video data stream 205, decode (e.g., decompress) the resultant video frames, estimate the video quality of the decoded video frames, and render the decoded video frames, based on the estimated video quality of the decoded video frames.

According to aspects described herein, the device 115-b may render video frames based on a video quality of each video frame (e.g., a video quality determined or estimated by the device 115-b). In some examples, the device 115-b may render all received video frames (e.g., partially or fully received video frames), regardless of a video quality. In some other examples, the device 115-b may render perfect video frames (e.g., video frames having no error, where the video frames have a macroblock concealment value of 0 and perfect reference frame(s) if the video frame is a predicted frame). In other examples, the device 115-b may render all perfect frames in combination with corrupted frames having a video quality degradation value less than $T_{QD}$, where $T_{QD}$ is a video quality degradation threshold value (e.g., maximum allowable video quality degradation threshold value). In some examples, $T_{QD}$ may be set (e.g., configured) to a value included within a range of, for example, 0 to 100. In some examples, when $T_{QD}$ is set to 100, the device 115-b may provide a user with a viewing experience as described above, for example, the device 115-b may render all received video frames (e.g., partially or fully received video frames, regardless of video quality). In some other examples, when $T_{QD}$ is set to 0, the device 115-b may provide a user with a viewing experience as described above, for example, the device 115-b may render perfect video frames (e.g., video frames having no error).

The device 115-b may configure $T_{QD}$ (or a range of $T_{QD}$) based on a user preference or default configuration of the device 115-b. For example, the device 115-b may configure $T_{QD}$ to a value within a range of 0 to 100 for video frame rendering based on a user preference including an image quality preference or a video smoothness preference. That is, the device 115-b may identify a priority for image quality or video smoothness for video frame rendering based on the user preference. In some examples, the device 115-b may dynamically configure $T_{QD}$ during the video telephone call. As such, $T_{QD}$ may be maintained at a configured value or dynamically configured by the devices 115 (for example, device 115 of FIG. 1, devices 115-a or device 115-b of FIG. 2, etc.), in response to a change in user preferences).

In some examples, the device 115-b may use one or more of a spatial error concealment scheme and a temporal error concealment scheme in video decoding and post-processing techniques to provide one or more of spatial and temporal error concealment capabilities. As described above, the device 115-b may support the ability to estimate the video quality of a video frame of the set of video frames using error concealment information (also referred to as a macroblock concealment value). Macroblock concealment is a concealment scheme typical to some devices which may include one or more of a spatial error concealment scheme and a temporal error concealment scheme. Error propagation from an error concealed video frame may be spread to subsequent video frames if the error concealed video frame is a reference frame of subsequent video frames, which may be a challenge to track by the device 115-b. The device 115-b (as well as, the device 115-a) may be capable of using a macroblock concealment value of a current video frame and, if the current video frame is not an instantaneous frame or an error recovery frame, a weighted estimated quality of the reference frame(s) (or the preceding video frame) of the current video frame to estimate a quality of the current video frame. The device 115-b may estimate the error propagation using the weighted estimated quality of the reference frames(s) (or the preceding video frame). The macroblock concealment value may represent a level of one or more of spatial and temporal error concealment applied to a current video frame. In some examples, the device 115-b, may be unable to determine a video quality (e.g., unable to track error propagation). The device 115-b may, however, be able to determine error concealment information. For example, a video frame (e.g. current frame) may be missing one or more macroblocks or contain bit errors but may include a macroblock concealment value between 0 and 100 representing the amount (e.g., percentage) of macroblocks which are error concealed. By way of example macroblock concealment value of 0 may represent no error concealment in current frame. In some examples, a higher the macroblock concealment value may indicate a poorer video quality of a video frame.

The device 115-b may determine an estimated video quality QD(n) of a video frame n according to a frame type. In some examples, the video frame n may be an instantaneous decoder refresh frame or an error recovery predicted frame. An instantaneous decoder refresh frame may be encoded without any reference frame. An error recovery predicted frame may be encoded with a reference frame(s) that is a perfect frame at the receiving side of the device (e.g., may be a predicted frame generated based on a long-term reference frame with or without carrying a recovery point supplemental enhancement information message as an indication). For example, a recovery point supplemental enhancement information message may be used to indicate an error recovery predicted frame. In this example, the recovery point supplemental enhancement information message may precede the error recovery predicted frame to serve as an indication. In some examples, when the video frame n is an instantaneous decoder refresh frame or an error recovery predicted frame generated based on a long-term reference frame, the estimated video quality QD(n) of the video frame n may be the macroblock concealment value of the video frame n. Additionally, the instantaneous decoder refresh frame or an error recovery predicted frame may not be rendered unless its macroblock concealment value is less than or equal to the configured video quality degradation threshold value. In some examples, a predicted frame may be encoded with more than one video reference frame. For example, in video telephony, there may be a single reference frame. A reference frame of a predicted frame (except for error recovery predicted frames) may be a preceding video frame. In some examples, when all the real-time transport protocol packets of video frame n are lost, the device 115-b may set the macroblock concealment value of video frame n to 100 percent, regardless of the frame type of the video frame n, and the estimated video quality QD(n) of the video frame n may be the macroblock concealment value of video frame n.

According to aspects herein, the macroblock concealment value may be provided by the decoder (e.g., video frame decoder) or decoder post-processing. In other examples, when the video frame n is a predicted frame (except, for example, when the video frame is an error recovery predicted frame), the estimated video quality QD(n) may be based on an estimated video quality of a preceding video frame (or reference frame) (e.g., QD(n−1)) to the video frame n of the set of video frames and a macroblock concealment value associated with the video frame, as well as a weighting factor (e.g., (1+α)). Thus, the estimated video quality QD(n) for a predicted frame (except, for example, when the video frame is an error recovery predicted frame) may be defined as QD(n)=(1+α)×QD(n−1)+macroblock concealment value of frame n, where 0≤α≤1. QD(n) may be capped at 100 percent. The value of a may be configurable, for example, according to frame rate (e.g., to be the same or different for different frame rates). According to aspects herein, the macroblock concealment value may be provided by the decoder (e.g., device 115-b) or decoder post-processing.

In some examples, when a video quality degradation threshold value is below a threshold (e.g., $T_{QD}$<100) and the estimated video quality of a video frame n is equal to or less than the video quality degradation threshold value (e.g., QD(n)≤$T_{QD}$), the device 115-b may render the video frame n. In some other examples, when a video quality degradation threshold value is below a threshold (e.g., $T_{QD}$<100) and the estimated video quality of a video frame n is greater than the video quality degradation threshold value (e.g., QD(n)>$T_{QD}$), the device 115-b may refrain from rendering the video frame n (e.g., pause/stop playback/rendering of the video frame n). The device 115-b may refrain from rendering the video frame n and any following video frames until receiving a subsequent frame including an instantaneous decoder refresh frame or an error recovery predicted frame with or without carrying a recovery point supplemental enhancement information message as an indication. In some examples, the device 115-b may pause the operations related to estimating a video quality of a video frame. When an instantaneous decoder refresh frame or an error recovery predicted frame with or without carrying a recovery point supplemental enhancement information message as an indication is received, the device 115-b may restart the video quality estimation and determine whether the video frame n or one or more video frames subsequent to the video frame n will be rendered. In an example, assuming frames n, n+1, n+2, n+3, n+4, n+5, . . . where the estimated quality degradation of frame n is greater than $T_{QD}$, and the next instantaneous decoder refresh frame or error recovery frame is n+5, the device 115-b may determine not to render frames n, n+1, n+2, n+3, and n+4. The device 115-b may resume rendering at frame n+5 if the estimated quality degradation (e.g., macroblock concealment value) of frame n+5 is less than or equal to $T_{QD}$. In a further example, assuming frames n, n+1, n+2, n+3, n+4, n+5, n+6, n+7, . . . where frames n+3 and n+7 are IDR frames or error recovery frames, the estimated quality degradation of frames n to n+2 is ≤$T_{QD}$, and the estimated quality degradation of frame n+3 is >$T_{QD}$, the device may determine to render frames n to n+2 and may determine not to render frames n+3 to n+6. The device 115-b may resume rendering at frame n+7 if the estimated quality degradation (e.g., macroblock concealment value) of frame n+7 is less than or equal to $T_{QD}$. In other examples, when a video quality degradation threshold value is set to a threshold (e.g., $T_{QD}$=100), the device 115-b may render all decoded video frames.

The techniques described with reference to system 100 may promote devices 115 to support improved rendering of video frames 210 for video telephone services according to a frame type (e.g., a perfect frame or a corrupted frame) of the video frames 210. Supported improved video frame rendering by devices 115 may include rendering all (partially or fully) received video frames 210 regardless of video quality, rendering perfect video frames (e.g., non-corrupted video frames or video frames without error), and rendering a combination of perfect frame, as well as non-perfect (e.g., corrupted) frames having a video quality degradation value below a video quality degradation threshold value. The supported improved video frame rendering by devices 115 may promote flexibility in video rendering and resource usage (e.g., processor utilization, power consumption). Some examples of the techniques described with reference to system 100 may further promote devices 115 to support estimating a video quality of video frames 210 according to error concealment information (e.g., macroblock concealment information) and, if the video frame is a predicted frame except for an error recovery predicted frame, the weighted estimated quality of its reference frames (or the preceding frame). The techniques described herein may therefore provide a mechanism for devices 115 to overcome shortcomings of video decoder and post-processing techniques that lack tracking capabilities of error propagation. As a result, devices 115 may support one or more of spatial and temporal error concealment capabilities, as well as tracking capabilities of error propagation.

Figure 3A:
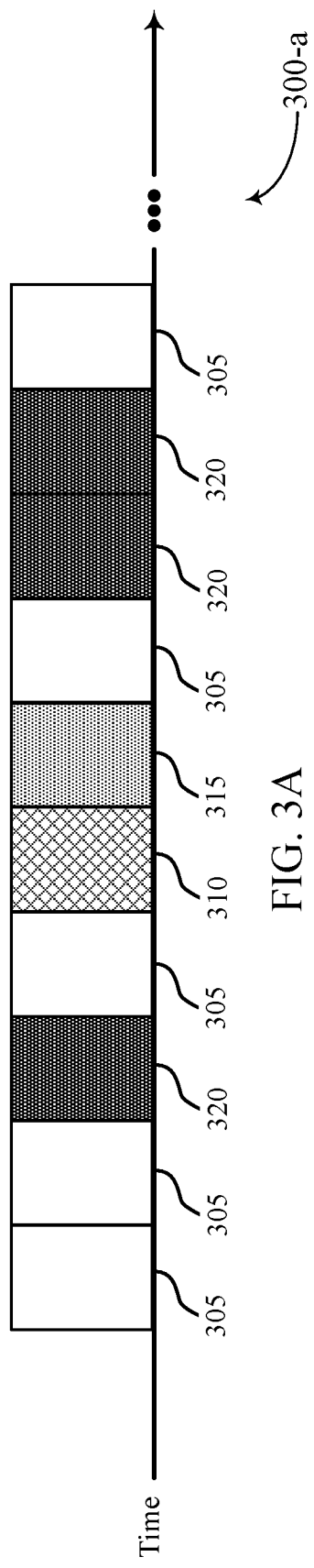
FIGS. 3A through 3C illustrate examples of a rendering scheme that supports video frame rendering criteria for video telephony service in accordance with aspects of the present disclosure.
Figure 3B:
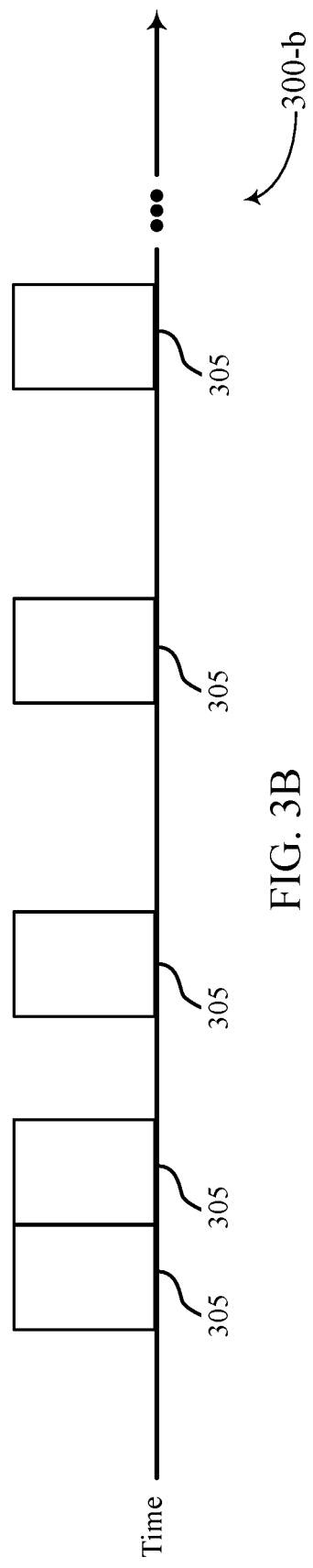
Figure 3C:
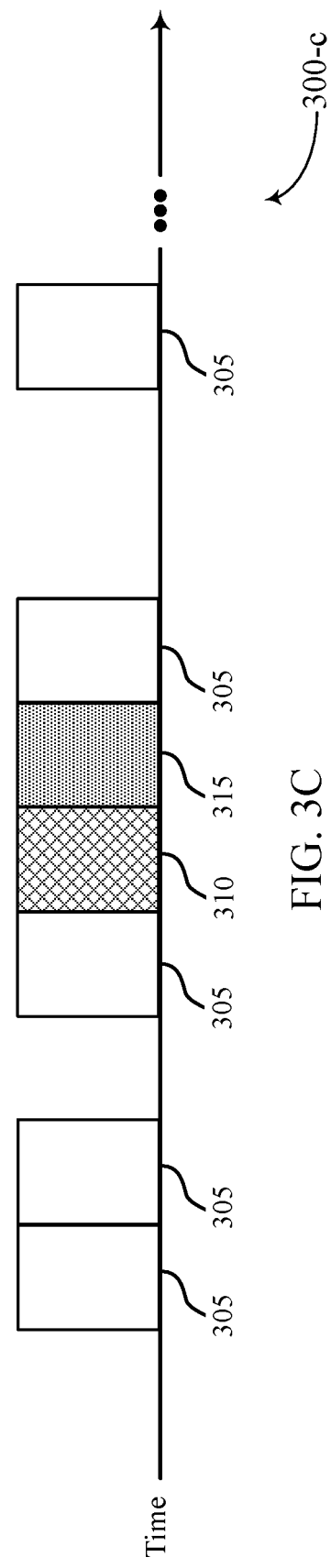

FIGS. 3A through 3C illustrate example rendering schemes 300-a through 300-c that support video frame rendering criteria for video telephony service in accordance with aspects of the present disclosure. In some examples, rendering schemes 300-a through 300-c may implement aspects of systems 100 and 200. For example, rendering schemes 300-a through 300-c illustrate examples of rendering video frames according to frame type, for video frames generated (e.g., reconstructed from a set of video packets, for example, through depacketizing, reassembly and decoding) by any of the example devices 115 as described herein. Referring to the examples illustrated in FIGS. 3A through 3C, video frames 305 represent perfect frames, video frames 310 represent corrupted frames having a small estimated video quality degradation value (e.g., 10 percent), video frames 315 represent corrupted frames having a slightly larger estimated video quality degradation value (e.g., 15 percent) and video frames 320 represent corrupted frames having a large estimated video quality degradation value (e.g., 50 percent).

Referring to FIG. 3A, rendering scheme 300-a is an example of rendering video frames of all frame types, regardless of quality, with $T_{QC}$ of 100 percent, as described in accordance with aspects of the present disclosure. In FIG. 3A, for example, rendering scheme 300-a may include rendering all video frames 305, video frames 310, video frames 315, and video frames 320. Referring to FIG. 3B, rendering scheme 300-b is an example of rendering perfect video frames (e.g., video frames having no error, where the video frames have a macroblock concealment value of 0 and perfect reference frame(s) if the video frame is a predicted frame). In FIG. 3B, for example, rendering scheme 300-b may include rendering video frames 305, with $T_{QD}$ of 0 percent. Referring to FIG. 3C, rendering scheme 300-c is an example of rendering all perfect frames in combination with corrupted frames having a video quality degradation value less than or equal to $T_{QD}$. In FIG. 3C, for example, rendering scheme 300-c may include rendering video frames 305, video frames 310 and video frames 315, with $T_{QD}$ of 25 percent.

Figure 4:
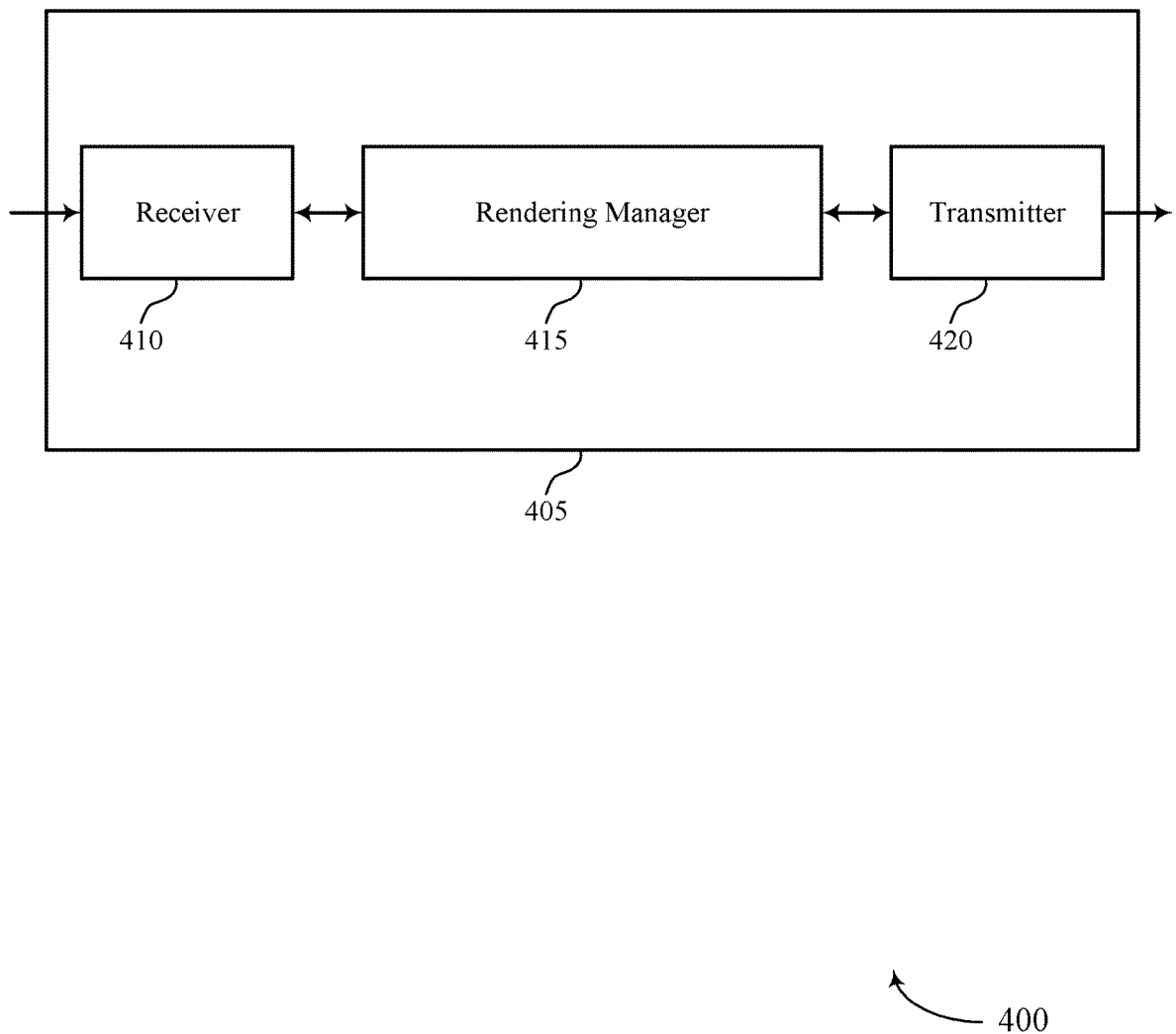
FIGS. 4 and 5 show block diagrams of devices that support video frame rendering criteria for video telephony service in accordance with aspects of the present disclosure.

FIG. 4 shows a block diagram 400 of a device 405 that supports video frame rendering criteria for video telephony service in accordance with aspects of the present disclosure. The device 405 may be an example of aspects of a device as described herein. The device 405 may include a receiver 410, a rendering manager 415, and a transmitter 420. The device 405 may also include a processor. Each of these components may or may not be in communication with one another (e.g., via one or more buses).

The receiver 410 may receive information such as packets, user data, or control information associated with various information channels (e.g., control channels, data channels, and information related to video frame rendering criteria for video telephony service, etc.). Information may be passed on to other components of the device 405. The receiver 410 may be an example of aspects of the transceiver 740 described with reference to FIG. 7. The receiver 410 may utilize a single antenna or a set of antennas.

The rendering manager 415 may receive a set of video packets over a video connection, generate a set of video frames based on the set of video packets, determine to render a video frame of the set of video frames based on a frame type of the video frame or a rendering criteria including a video quality of the video frame, or both, where the frame type includes a perfect frame or a corrupted frame, render the video frame of the set of video frames based on the frame type of the video frame or the video frame satisfying the rendering criteria, or both, and output the rendered video frame for display. The rendering manager 415 may be an example of aspects of the rendering manager 710 described herein.

The rendering manager 415, or its sub-components, may be implemented in hardware, code (e.g., software or firmware) executed by a processor, or any combination thereof. If implemented in code executed by a processor, the functions of the rendering manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The rendering manager 415, or its sub-components, may be physically located at various positions, including being distributed such that portions of functions are implemented at different physical locations by one or more physical components. In some examples, the rendering manager 415, or its sub-components, may be a separate and distinct component in accordance with various aspects of the present disclosure. In some examples, the rendering manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 740 described with reference to FIG. 7. The transmitter 420 may utilize a single antenna or a set of antennas.

Figure 5:
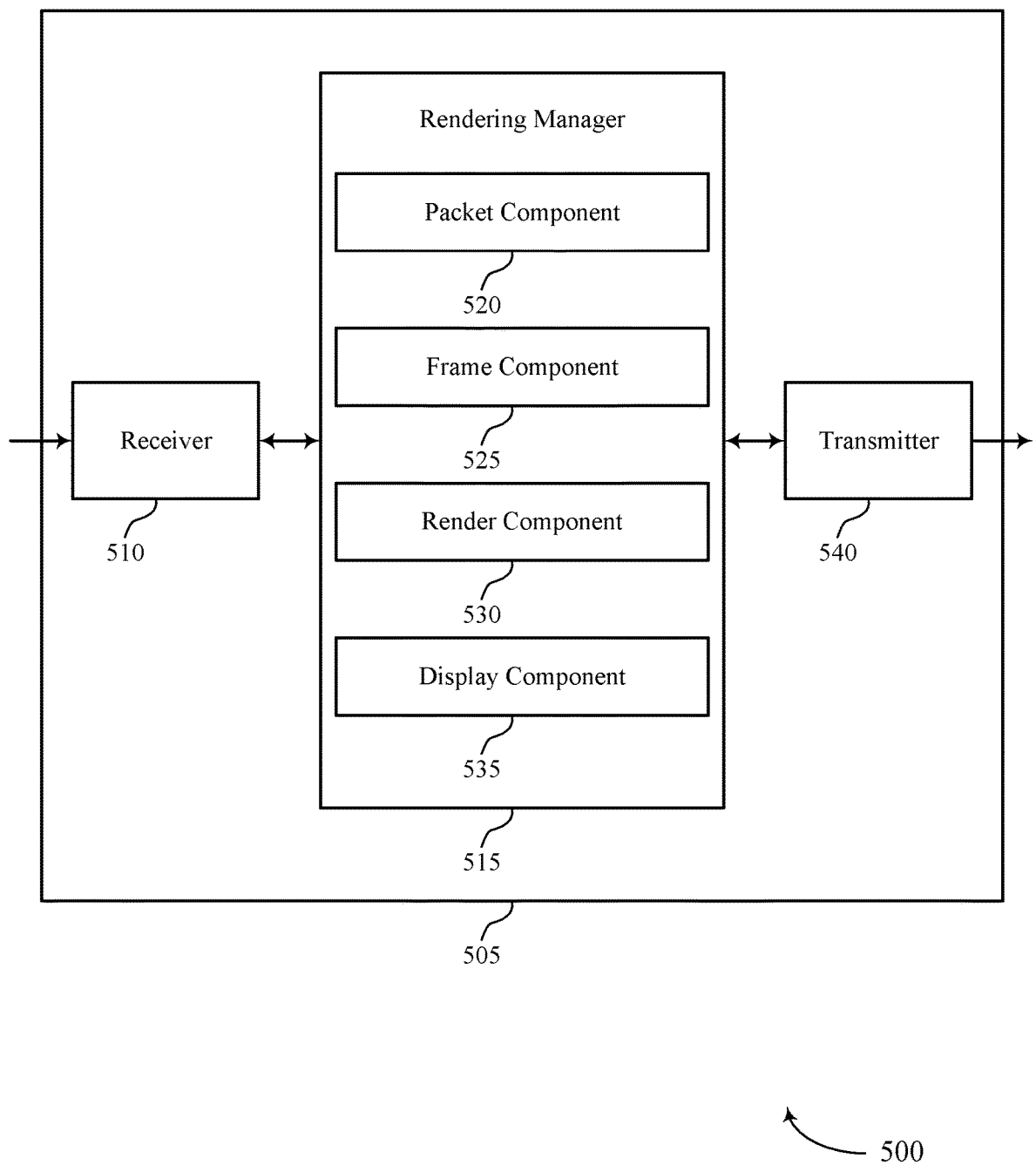

FIG. 5 shows a block diagram 500 of a device 505 that supports video frame rendering criteria for video telephony service in accordance with aspects of the present disclosure. The device 505 may be an example of aspects of a device 405 or a device 115 as described herein. The device 505 may include a receiver 510, a rendering manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to video frame rendering criteria for video telephony service, etc.). Information may be passed on to other components of the device 505. The receiver 510 may be an example of aspects of the transceiver 740 described with reference to FIG. 7. The receiver 510 may utilize a single antenna or a set of antennas.

The rendering manager 515 may be an example of aspects of the rendering manager 415 as described herein. The rendering manager 515 may include a packet component 520, a frame component 525, a render component 530, and a display component 535. The rendering manager 515 may be an example of aspects of the rendering manager 710 described herein.

The packet component 520 may receive a set of video packets over a video connection. The frame component 525 may generate a set of video frames based on the set of video packets. The render component 530 may determine to render a video frame of the set of video frames based on a frame type of the video frame or a rendering criteria including a video quality of the video frame, or both, where the frame type includes a perfect frame or a corrupted frame and render the video frame of the set of video frames based on the frame type of the video frame or the video frame satisfying the rendering criteria, or both. The display component 535 may output the rendered video frame for display.

In some examples, the render component 530 may determine to refrain from rendering the video frame of the set of video frames or one or more video frames subsequent to the video frame based on the estimated video quality of the video frame of the set of video frames failing to satisfy a video quality degradation threshold value, where the frame type includes a predicted frame except for an error recovery predicted frame with or without carrying a recovery point supplemental enhancement information message as an indication, until a subsequent frame comprising an instantaneous decoder refresh frame or an error recovery predicted frame with or without carrying a recovery point supplemental enhancement information message as an indication is received.

In some examples, the render component 530 may refrain from rendering the video frame of the set of video frames or one or more video frames subsequent to the video frame based on the estimated video quality of the video frame of the set of video frames failing to satisfy a video quality degradation threshold value, where the frame type includes an instantaneous decoder refresh frame or an error recovery predicted frame with or without carrying a recovery point supplemental enhancement information message as an indication, until a subsequent frame comprising an instantaneous decoder refresh frame or an error recovery predicted frame with or without carrying a recovery point supplemental enhancement information message as an indication is received.

The transmitter 540 may transmit signals generated by other components of the device 505. In some examples, the transmitter 540 may be collocated with a receiver 510 in a transceiver module. For example, the transmitter 540 may be an example of aspects of the transceiver 740 described with reference to FIG. 7. The transmitter 540 may utilize a single antenna or a set of antennas.

Figure 6:
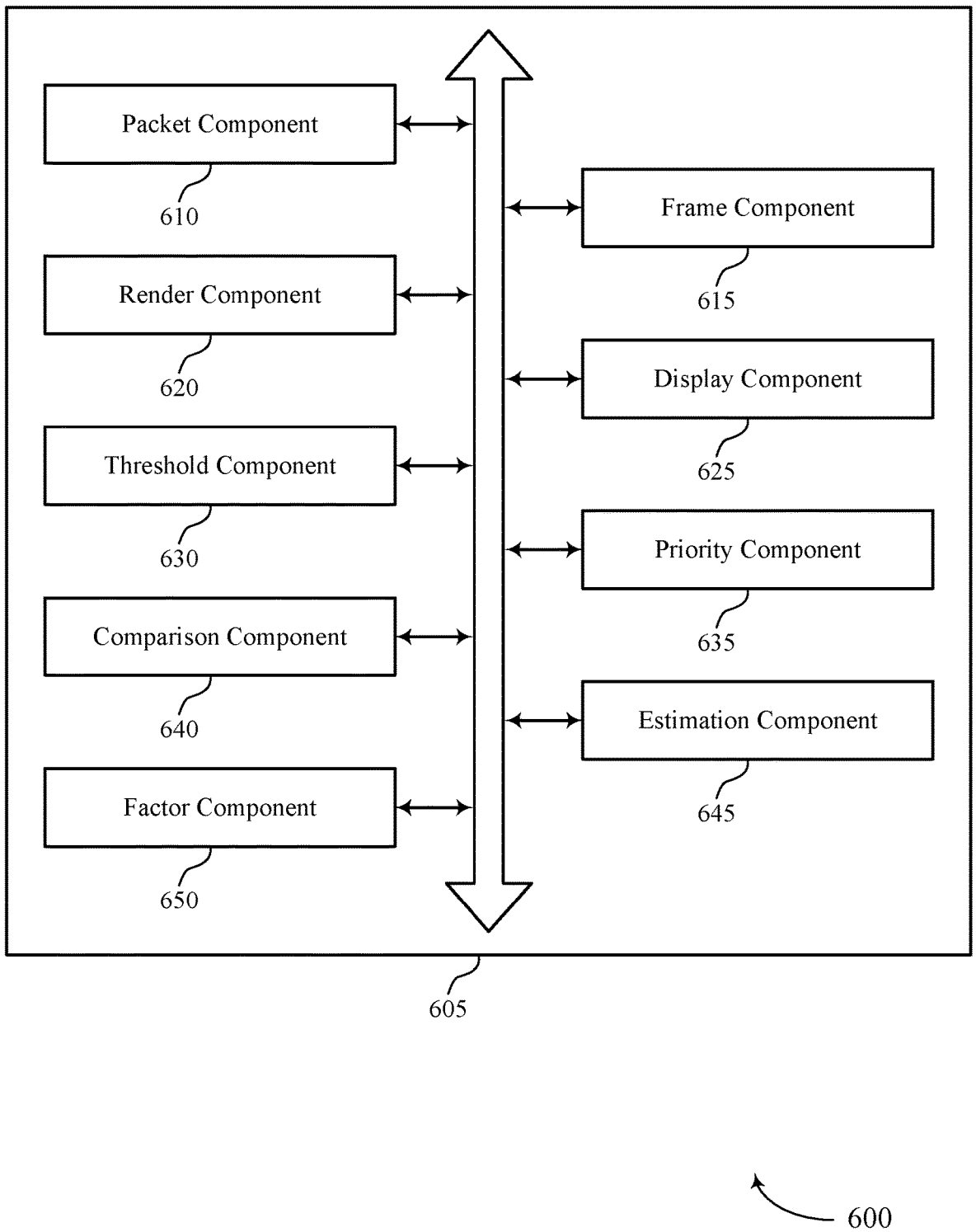
FIG. 6 shows a block diagram of a rendering manager that supports video frame rendering criteria for video telephony service in accordance with aspects of the present disclosure.

FIG. 6 shows a block diagram 600 of a rendering manager 605 that supports video frame rendering criteria for video telephony service in accordance with aspects of the present disclosure. The rendering manager 605 may be an example of aspects of a rendering manager 415, a rendering manager 515, or a rendering manager 710 described herein. The rendering manager 605 may include a packet component 610, a frame component 615, a render component 620, a display component 625, a threshold component 630, a priority component 635, a comparison component 640, an estimation component 645, and a factor component 650. In some examples, each of these components may be in communication with one another or some of the components (e.g., via one or more buses).

The packet component 610 may receive a set of video packets (e.g., video real-time transport protocol packets) over a video connection. The frame component 615 may generate a set of video frames based on the set of video packets. In some examples, the frame component 615 may determine the video frame of the set of video frames includes one or more of an instantaneous decoder refresh frame or an error recovery predicted frame. In some examples, the frame component 615 may determine the video frame of the set of video frames includes a predicted frame. In some examples, the frame component 615 may determine the video frame of the set of video frames includes a predicted frame except for an error recovery predicted frame with or without carrying a recovery point supplemental enhancement information message as an indication. In some examples, the frame component 615 may determine the video frame of the set of video frames includes an instantaneous decoder refresh frame or an error recovery predicted frame with or without carrying a recovery point supplemental enhancement information message as an indication.

The render component 620 may determine to render a video frame of the set of video frames based on a frame type of the video frame or a rendering criteria including a video quality of the video frame, or both, where the frame type includes a perfect frame or a corrupted frame. In some examples, the render component 620 may render the video frame of the set of video frames based on the frame type of the video frame or the video frame satisfying the rendering criteria, or both. For example, the render component 620 may render the video frame of the set of video frames based on outputs by the threshold component 630 and the comparison component 640 described herein. In some examples, the render component 620 may determine that the video quality of the video frame of the set of video frames satisfies the video quality degradation threshold value. In some examples, the render component 620 may render the video frame of the set of video frames based on the video quality of the video frame of the set of video frames satisfying the video quality degradation threshold value. In some examples, the render component 620 may determine that the estimated video quality of the video frame of the set of video frames satisfies the video quality degradation threshold value. In some examples, the render component 620 may render the video frame of the set of video frames based on the estimated video quality of the video frame of the set of video frames satisfying the video quality degradation threshold value.

In some examples, the render component 620 may determine that the estimated video quality of the video frame of the set of video frames fails to satisfy the video quality degradation threshold value. In some examples, rendering the video frame of the set of video frames includes refraining from rendering the video frame of the set of video frames or one or more video frames subsequent to the video frame based on the estimated video quality of the video frame of the set of video frames failing to satisfy the video quality degradation threshold value. In some examples, the render component 620 may refrain from rendering the video frame of the set of video frames until receiving a subsequent frame including an instantaneous decoder refresh frame or an error recovery predicted frame with or without carrying a recovery point supplemental enhancement information message as an indication. For example, a recovery point supplemental enhancement information message may be used to indicate an error recovery predicted frame. In this example, the recovery point supplemental enhancement information message may precede the error recovery predicted frame to serve as an indication.

The display component 625 may output the rendered video frame for display. The threshold component 630 may determine a video quality degradation threshold value, where rendering the video frame of the set of video frames is further based on the video quality degradation threshold value. In some examples, the threshold component 630 may dynamically configure the video quality degradation threshold value based on a user preference. In some cases, the video quality degradation threshold value includes a threshold range. The priority component 635 may identify a priority of the video quality of the set of video frames based on the user preference. In some examples, the priority component 635 may dynamically configure the video quality degradation threshold value is further based on the priority of the video quality. The comparison component 640 may compare the video quality of the video frame of the set of video frames to the video quality degradation threshold value.

The estimation component 645 may determine an estimated video quality of the video frame of the set of video frames based on a macroblock concealment value of the video frame of the set of video frames. In some examples, the estimation component 645 may determine an estimated video quality of the video frame of the set of video frames based on a macroblock concealment value associated with the video frame. In some examples, the estimation component 645 may determine that the estimated video quality of the video frame of the set of video frames satisfies the video quality degradation threshold value. In some examples, the estimation component 645 may determine an estimated video quality of the video frame of the set of video frames based on an estimated video quality of a preceding video frame to the video frame of the set of video frames and a macroblock concealment value associated with the video frame.

In some examples, the estimation component 645 may determine the estimated video quality of the video frame of the set of video frames further based on applying the weighting factor to the estimated video quality of the preceding video frame. In some cases, a macroblock concealment value may be based on the video frame of the set of video frames being packetized according to the real-time transport protocol. The factor component 650 may determine a weighting factor to apply to the estimated video quality of the preceding video frame based on a frame rate of the set of video frames. In some examples, the factor component 650 may apply the weighting factor to the estimated video quality of the preceding video frame.

As detailed above, rendering manager 605 and/or one or more components of the rendering manager 605 may perform and/or be a means for performing, either alone or in combination with other elements, one or more operations for video frame rendering criteria for video telephony service in accordance with aspects of the present disclosure.

Figure 7:
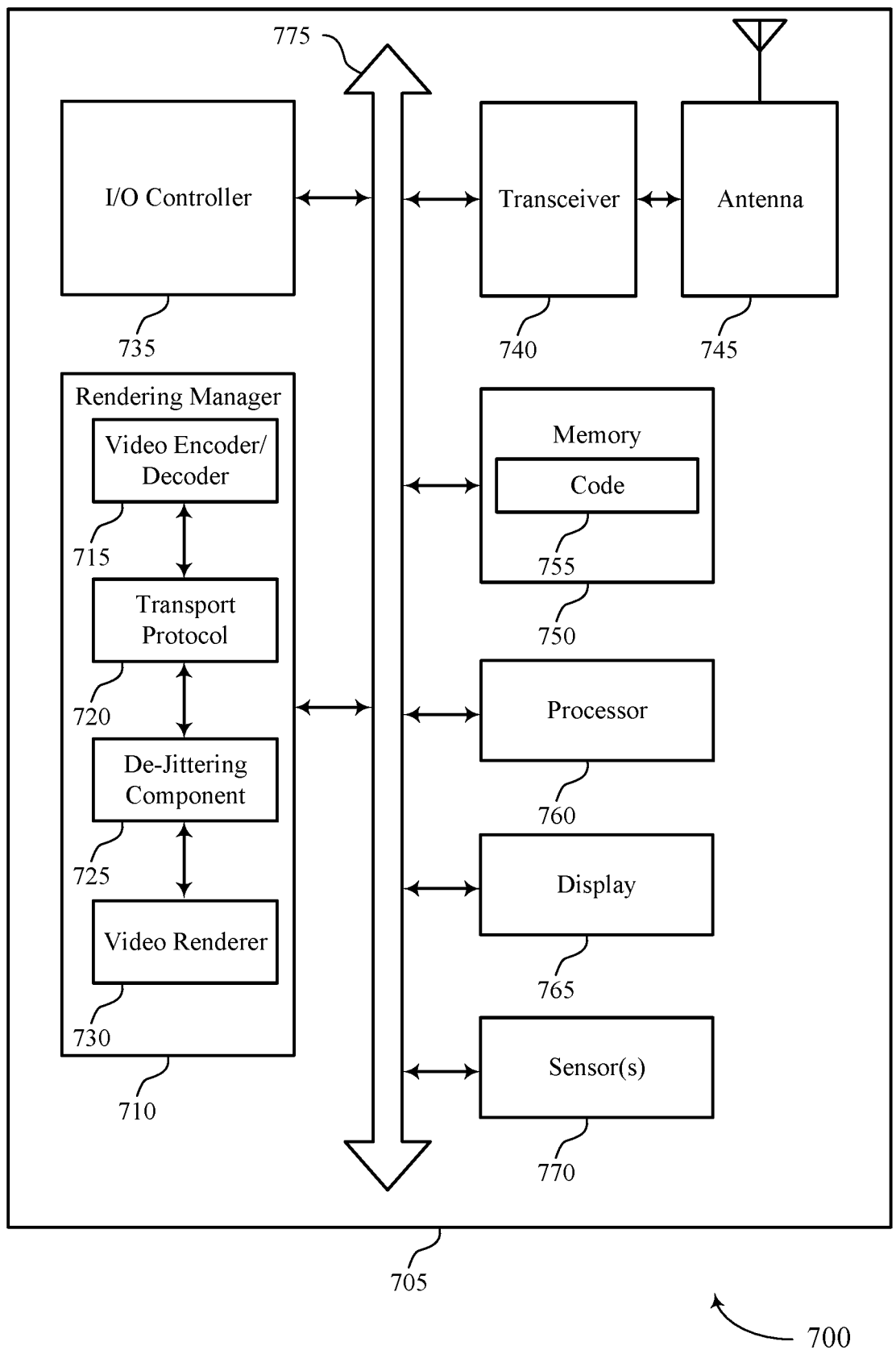
FIG. 7 shows a diagram of a system including a device that supports video frame rendering criteria for video telephony service in accordance with aspects of the present disclosure.

FIG. 7 shows a diagram of a system 700 including a device 705 that supports video frame rendering criteria for video telephony service in accordance with aspects of the present disclosure. The device 705 may be an example of or include the components of device 405, device 505, or a device as described herein. The device 705 may be one or more of a receiving device and a transmitting device during a video telephony call. The device 705 may include components for bi-directional voice, video and data communications including components for transmitting and receiving communications, including a rendering manager 710, an I/O controller 735, a transceiver 740, an antenna 745, memory 750, a processor 760, a display 765, and sensor(s) 770. These components may be in electronic communication via one or more buses (e.g., bus 775).

The rendering manager 710 may include a video encoder/decoder 715, a transport protocol 720, a de-jittering component 725, and a video renderer 730. These components may be in electronic communication via one or more buses (not shown). The video encoder/decoder 715 may manage encoding and decoding of video frames. In the example, that the device 705 is a transmitting device during a video telephony session, the video encoder/decoder 715 may receive a captured video frame from a camera such as, for example, sensor(s) 770. The video encoder/decoder 715 may compress the video frame and forward the compressed video frame to the transport protocol 720, which may manage packetization. For example, the transport protocol 720 may apply a real time transport protocol to video packets carrying the compressed video frames to be transmitted over a network (e.g., PS network). In some examples, the transport protocol 720 may forward the packetized video packets to a modem such as, for example, the transceiver 740 for transmission to a receiving device of a video telephony session. In the example that the device 705 is a receiving device during the video telephony session, the transport protocol 720 may receive from a modem such as, for example, the transceiver 740 packetized video packets and perform depacketization of each received real time transport protocol video packet. The transport protocol 720 may forward the depacketized video packets to the de-jittering component 725, which may remove jitter from the depacketized video packets that may be caused by transmission over the network (e.g., PS network) and reassemble the compressed video frames from the depacketized video packets. The de-jittering component 725 may forward the reassembled compressed video frames to the video encoder/decoder 715, which may reproduce the video frames from the reassembled compressed video frames. The video renderer 730 may render the video frames, for example, for presentation at the display 765.

In some examples, the rendering manager 710 alone or in combination with one or more of the components of the system 700 may receive a set of video packets over a video connection, generate a set of video frames based on the set of video packets, determine to render a video frame of the set of video frames based on a frame type of the video frame or a rendering criteria including a video quality of the video frame, or both, where the frame type includes a perfect frame or a corrupted frame, render the video frame of the set of video frames based on the frame type of the video frame or the video frame satisfying the rendering criteria, or both, and output the rendered video frame for display.

The I/O controller 735 may manage input and output signals for the device 705. The I/O controller 735 may also manage peripherals not integrated into the device 705. In some cases, the I/O controller 735 may represent a physical connection or port to an external peripheral. In some cases, the I/O controller 735 may utilize an operating system such as iOS, ANDROID, MS-DOS, MS-WINDOWS, OS/2, UNIX, LINUX, or another known operating system. In other cases, the I/O controller 735 may represent or interact with a modem, a keyboard, a mouse, a touchscreen, or a similar device. In some cases, the I/O controller 735 may be implemented as part of a processor. In some cases, a user may interact with the device 705 via the I/O controller 735 or via hardware components controlled by the I/O controller 735.

The transceiver 740 may communicate bi-directionally, via one or more antennas, wired, or wireless links as described above. For example, the transceiver 740 may represent a wireless transceiver and may communicate bi-directionally with another wireless transceiver. The transceiver 740 may also be referred to as a modem or may include a modem to modulate the packets and provide the modulated packets to the antennas for transmission, and to demodulate packets received from the antennas. In some examples, the device 705 may include a single antenna 745. However, in some examples, the device 705 may have more than one antenna 745, which may be capable of concurrently transmitting or receiving multiple wireless transmissions.

The memory 750 may include RAM and ROM. The memory 750 may store computer-readable, computer-executable code 755 including instructions that, when executed, cause the processor to perform various functions described herein. In some cases, the memory 750 may contain, among other things, a BIOS which may control basic hardware or software operation such as the interaction with peripheral components or devices.

The code 755 may include instructions to implement aspects of the present disclosure, including instructions to support video frame rendering. The code 755 may be stored in a non-transitory computer-readable medium such as system memory or other type of memory. In some cases, the code 755 may not be directly executable by the processor 760 but may cause a computer (e.g., when compiled and executed) to perform functions described herein.

The processor 760 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 760 may be configured to operate a memory array using a memory controller. In other cases, a memory controller may be integrated into the processor 760. The processor 760 may be configured to execute computer-readable instructions stored in a memory (e.g., the memory 750) to cause the device 705 to perform various functions (e.g., functions or tasks supporting video frame rendering criteria for video telephony service).

The display 765 may represent a unit capable of displaying video, images, text or any other type of data for consumption by a viewer. In some examples, the display 765 may include a liquid-crystal display (LCD), a LED display, an organic LED (OLED), an active-matrix OLED (AMOLED), or the like. In some examples, the display 765 and I/O component 735 may be or represent aspects of a same component (e.g., a touchscreen) of the device 705. The display 765 may be configured to display multimedia content (e.g., images, video). For example, the display 765 may output the rendered video frame for display.

The sensor(s) 770 may be capable of capturing images or video. For example, sensor(s) 770 may represent a camera operable to capture an image or a video of a scene that may be processed by the components of the system 700 according to aspects of the present disclosure. In some examples, sensor(s) 770 may be an optical depth sensor, a lux sensor, a motion sensor, an infrared heat sensor, among others. In some examples, the device 705 may include more than one sensor. The sensor(s) 770 may also be configured with multiple functionalities. For example, a single sensor 770 may be capable to perform operations related to an image sensor, an optical depth sensor, a motion sensor, or a light sensor, or any combination thereof. The sensor(s) 770 650 may be a charge coupled device (CCD) sensor or a complementary metal-oxide semiconductor (CMOS) sensor.

Figure 8:
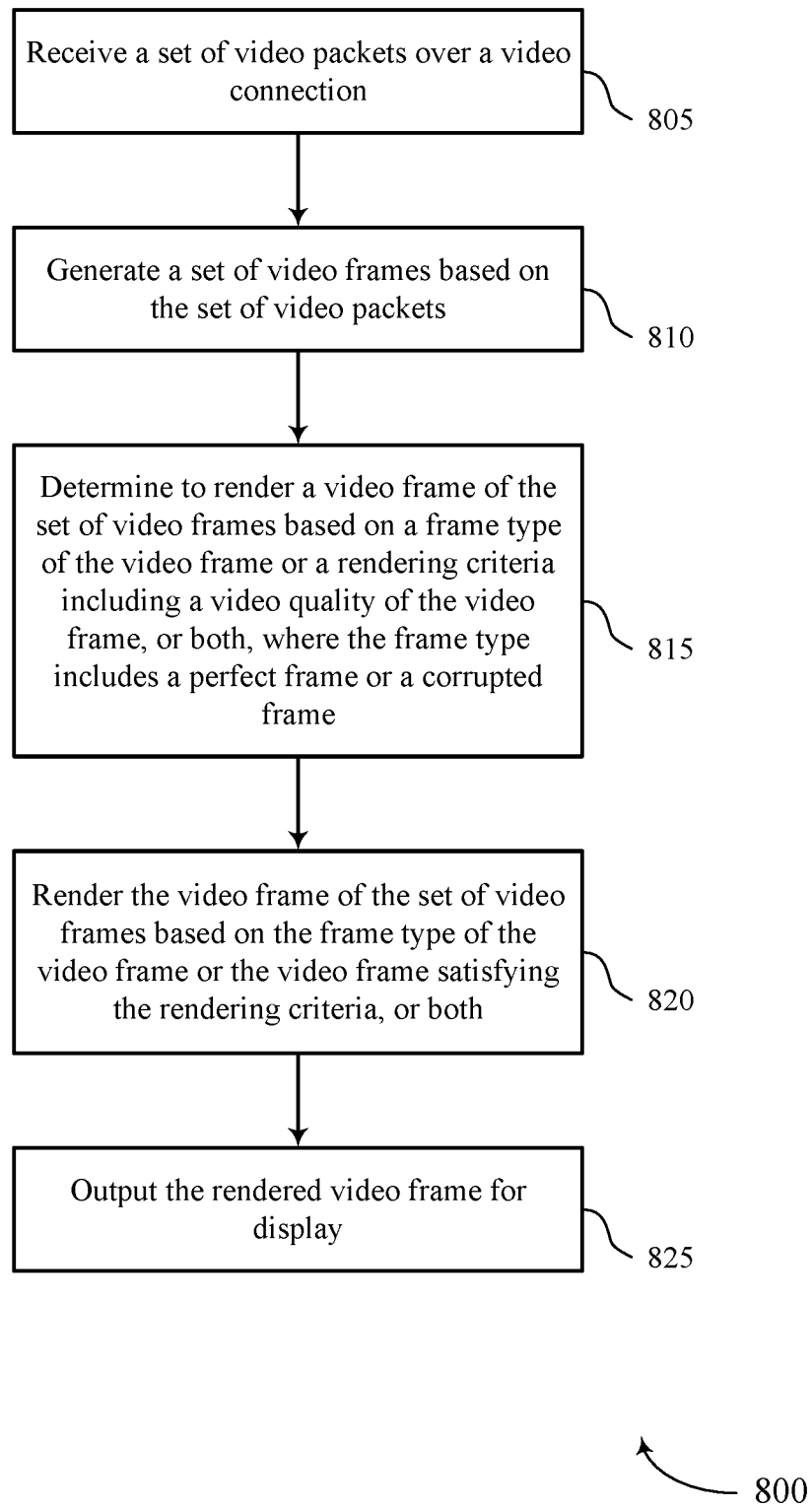
FIGS. 8 through 10 show flowcharts illustrating methods that support video frame rendering criteria for video telephony service in accordance with aspects of the present disclosure.

FIG. 8 shows a flowchart illustrating a method 800 that supports video frame rendering criteria for video telephony service in accordance with aspects of the present disclosure. The operations of method 800 may be implemented by a device or its components as described herein. For example, the operations of method 800 may be performed by a rendering manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 805, the device may receive a set of video packets over a video connection. The operations of 805 may be performed according to the methods described herein. In some examples, aspects of the operations of 805 may be performed by a packet component as described with reference to FIGS. 4 through 7.

At 810, the device may generate a set of video frames based on the set of video packets. The operations of 810 may be performed according to the methods described herein. In some examples, aspects of the operations of 810 may be performed by a frame component as described with reference to FIGS. 4 through 7.

At 815, the device may determine to render a video frame of the set of video frames based on a frame type of the video frame or a rendering criteria including a video quality of the video frame, or both, where the frame type includes a perfect frame or a corrupted frame. The operations of 815 may be performed according to the methods described herein. In some examples, aspects of the operations of 815 may be performed by a render component as described with reference to FIGS. 4 through 7.

At 820, the device may render the video frame of the set of video frames based on the frame type of the video frame or the video frame satisfying the rendering criteria, or both. The operations of 820 may be performed according to the methods described herein. In some examples, aspects of the operations of 820 may be performed by a render component as described with reference to FIGS. 4 through 7.

At 825, the device may output the rendered video frame for display. The operations of 825 may be performed according to the methods described herein. In some examples, aspects of the operations of 825 may be performed by a display component as described with reference to FIGS. 4 through 7.

Figure 9:
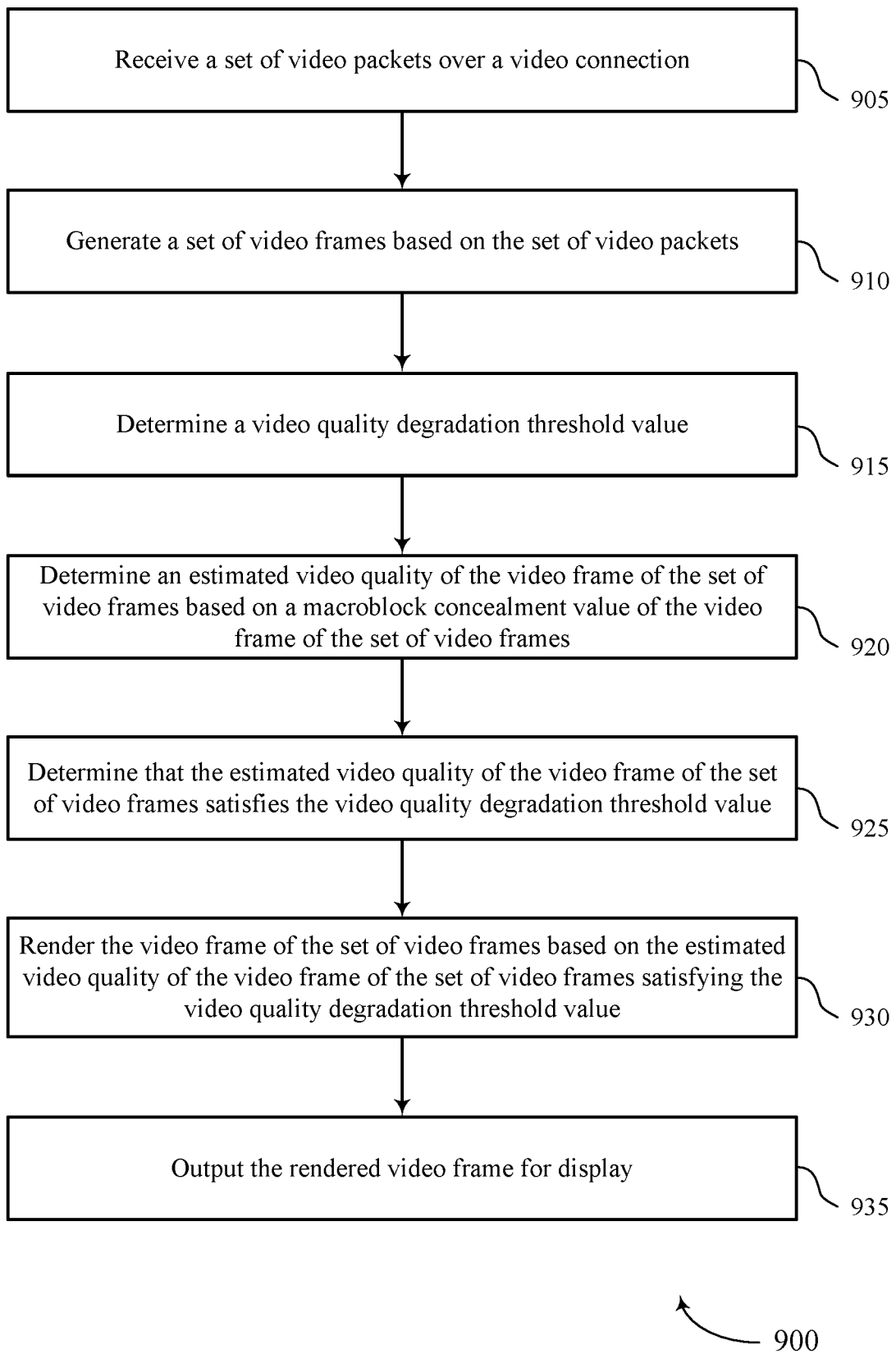

FIG. 9 shows a flowchart illustrating a method 900 that supports video frame rendering criteria for video telephony service in accordance with aspects of the present disclosure. The operations of method 900 may be implemented by a device or its components as described herein. For example, the operations of method 900 may be performed by a rendering manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 905, the device may receive a set of video packets over a video connection. The operations of 905 may be performed according to the methods described herein. In some examples, aspects of the operations of 905 may be performed by a packet component as described with reference to FIGS. 4 through 7.

At 910, the device may generate a set of video frames based on the set of video packets. The operations of 910 may be performed according to the methods described herein. In some examples, aspects of the operations of 910 may be performed by a frame component as described with reference to FIGS. 4 through 7.

At 915, the device may determine a video quality degradation threshold value. In some examples, the video quality degradation threshold value may be pre-configured or dynamically configured. The operations of 915 may be performed according to the methods described herein. In some examples, aspects of the operations of 915 may be performed by a threshold component as described with reference to FIGS. 4 through 7.

At 920, the device may determine an estimated video quality of the video frame of the set of video frames based on a macroblock concealment value of the video frame of the set of video frames. In some examples, if the video frame is a predicted frame other than an error recovery predicted frame, the device may determine a weighted estimated video quality of a reference frame(s) (or preceding frame) of the video frame. The operations of 920 may be performed according to the methods described herein. In some examples, aspects of the operations of 920 may be performed by an estimation component as described with reference to FIGS. 4 through 7.

At 925, the device may determine that the estimated video quality of the video frame of the set of video frames satisfies the video quality degradation threshold value. The operations of 925 may be performed according to the methods described herein. In some examples, aspects of the operations of 925 may be performed by a render component as described with reference to FIGS. 4 through 7.

At 930, the device may render the video frame of the set of video frames based on the estimated video quality of the video frame of the set of video frames satisfying the video quality degradation threshold value. The operations of 930 may be performed according to the methods described herein. In some examples, aspects of the operations of 930 may be performed by a render component as described with reference to FIGS. 4 through 7.

At 935, the device may output the rendered video frame for display. The operations of 935 may be performed according to the methods described herein. In some examples, aspects of the operations of 935 may be performed by a display component as described with reference to FIGS. 4 through 7.

Figure 10:
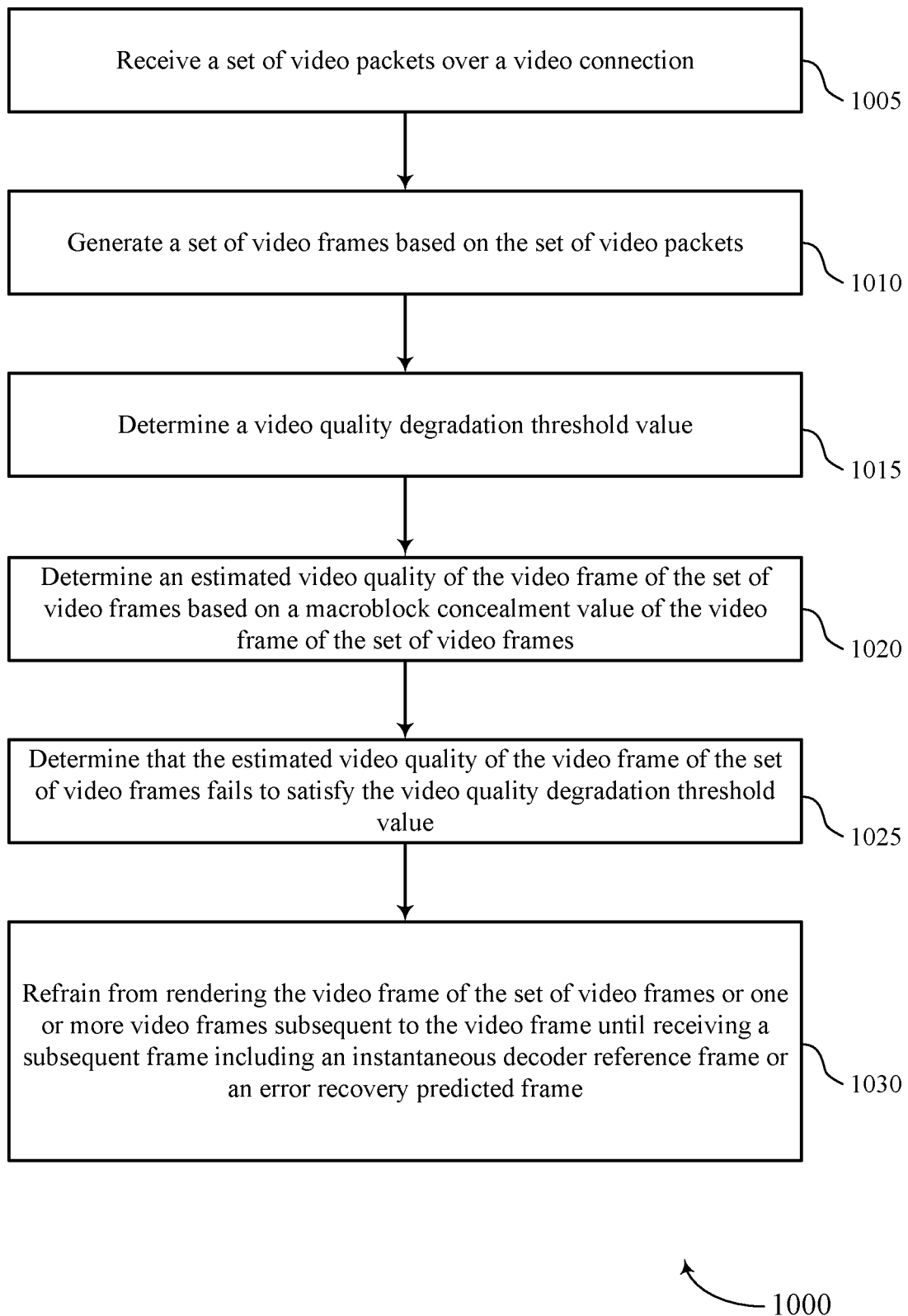

FIG. 10 shows a flowchart illustrating a method 1000 that supports video frame rendering criteria for video telephony service in accordance with aspects of the present disclosure. The operations of method 1000 may be implemented by a device or its components as described herein. For example, the operations of method 1000 may be performed by a rendering manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 1005, the device may receive a set of video packets over a video connection. The operations of 1005 may be performed according to the methods described herein. In some examples, aspects of the operations of 1005 may be performed by a packet component as described with reference to FIGS. 4 through 7.

At 1010, the device may generate a set of video frames based on the set of video packets. The operations of 1010 may be performed according to the methods described herein. In some examples, aspects of the operations of 1010 may be performed by a frame component as described with reference to FIGS. 4 through 7.

At 1015, the device may determine a video quality degradation threshold value. The operations of 1015 may be performed according to the methods described herein. In some examples, aspects of the operations of 1015 may be performed by a threshold component as described with reference to FIGS. 4 through 7

At 1020, the device may determine an estimated video quality of the video frame of the set of video frames based on a macroblock concealment value of the video frame of the set of video frames. In some examples, if the video frame is a predicted frame other than an error recovery predicted frame, the device may determine a weighted estimated video quality of a reference frame(s) (or preceding frame) of the video frame. The operations of 1020 may be performed according to the methods described herein. In some examples, aspects of the operations of 1020 may be performed by an estimation component as described with reference to FIGS. 4 through 7.

At 1025, the device may determine that the estimated video quality of the video frame of the set of video frames fails to satisfy the video quality degradation threshold value. The operations of 1025 may be performed according to the methods described herein. In some examples, aspects of the operations of 1025 may be performed by a render component as described with reference to FIGS. 4 through 7.

At 1030, the device may refrain from rendering the video frame of the set of video frames or one or more video frames subsequent the video frame until receiving a subsequent frame including an instantaneous decoder refresh frame or an error recovery predicted frame (where the error recovery predicted frame may or may not carry a recovery point supplemental enhancement information message as an indication) based on the estimated video quality of the video frame of the set of video frames failing to satisfy the video quality degradation threshold value. The operations of 1030 may be performed according to the methods described herein. In some examples, aspects of the operations of 1030 may be performed by a render component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for video frame rendering at a device, comprising:
   receiving a set of video packets over a video connection;
   generating a set of video frames based at least in part on the set of video packets;
   determining to render a video frame of the set of video frames based at least in part on a frame type of the video frame or a rendering criteria comprising a video quality of the video frame, or both, wherein the frame type comprises a perfect frame or a corrupted frame;
   identifying a priority of the video quality of the set of video frames based at least in part on a user preference;
   determining a video quality degradation threshold value based at least in part on the priority of the video quality;
   rendering the video frame of the set of video frames based at least in part on the frame type of the video frame, the video frame satisfying the rendering criteria, or the video quality degradation threshold, or any combination thereof; and
   outputting the rendered video frame for display.

2. The method of claim 1, wherein the video quality degradation threshold value comprises a threshold range.

3. The method of claim 1, further comprising:
   dynamically configuring the video quality degradation threshold value based at least in part on the user preference.

4. The method of claim 3,
   wherein dynamically configuring the video quality degradation threshold value is further based at least in part on the priority of the video quality.

5. The method of claim 1, wherein determining to render the video frame of the set of video frames comprises:
   comparing the video quality of the video frame of the set of video frames to the video quality degradation threshold value; and determining that the video quality of the video frame of the set of video frames satisfies the video quality degradation threshold value, wherein rendering the video frame of the set of video frames is further based at least in part on the video quality of the video frame of the set of video frames satisfying the video quality degradation threshold value.

6. The method of claim 1, wherein determining to render the video frame of the set of video frames comprises:

determining an estimated video quality of the video frame of the set of video frames based at least in part on a macroblock concealment value of the video frame of the set of video frames, wherein the macroblock concealment value is based at least in part on the video frame of the set of video frames being packetized according to a real-time transport protocol.

7. The method of claim 6, wherein determining to render the video frame of the set of video frames comprises:

determining that the estimated video quality of the video frame of the set of video frames satisfies the video quality degradation threshold value, wherein rendering the video frame of the set of video frames is further based at least in part on the estimated video quality of the video frame of the set of video frames satisfying the video quality degradation threshold value.

8. The method of claim 6, wherein determining to render the video frame of the set of video frames comprises:

determining that the estimated video quality of the video frame of the set of video frames fails to satisfy the video quality degradation threshold value, wherein rendering the video frame of the set of video frames comprises refraining from rendering the video frame of the set of video frames based at least in part on the estimated video quality of the video frame of the set of video frames failing to satisfy the video quality degradation threshold value.

9. The method of claim 8, wherein refraining from rendering the video frame of the set of video frames comprises:

refraining from rendering the video frame of the set of video frames or one or more video frames subsequent to the video frame until receiving a subsequent frame comprising an instantaneous decoder refresh frame or an error recovery predicted frame with or without carrying a recovery point supplemental enhancement information message as an indication.

10. The method of claim 1, wherein determining to render the video frame of the set of video frames comprises:

determining the video frame of the set of video frames comprises one or more of an instantaneous decoder refresh frame or an error recovery predicted frame;

determining an estimated video quality of the video frame of the set of video frames based at least in part on a macroblock concealment value associated with the video frame; and determining that the estimated video quality of the video frame of the set of video frames satisfies the video quality degradation threshold value, wherein rendering the video frame of the set of video frames is further based at least in part on the estimated video quality of the video frame of the set of video frames satisfying the video quality degradation threshold value.

11. The method of claim 1, wherein determining to render the video frame of the set of video frames comprises:

determining the video frame of the set of video frames comprises a predicted frame except for an error recovery predicted frame with or without carrying a recovery point supplemental enhancement information message as an indication;

determining an estimated video quality of the video frame of the set of video frames based at least in part on an estimated video quality of a preceding video frame to the video frame of the set of video frames and a macroblock concealment value associated with the video frame; and determining that the estimated video quality of the video frame of the set of video frames satisfies the video quality degradation threshold value, wherein rendering the video frame of the set of video frames is further based at least in part on the estimated video quality of the video frame of the set of video frames satisfying the video quality degradation threshold value.

12. The method of claim 11, further comprising:

determining a weighting factor to apply to the estimated video quality of the preceding video frame based at least in part on a frame rate of the set of video frames; and applying the weighting factor to the estimated video quality of the preceding video frame, wherein determining the estimated video quality of the video frame of the set of video frames is further based at least in part on applying the weighting factor to the estimated video quality of the preceding video frame.

13. The method of claim 1, wherein determining to render the video frame of the set of video frames comprises:

determining the video frame of the set of video frames comprises a predicted frame except for an error recovery predicted frame with or without carrying a recovery point supplemental enhancement information message as an indication;

determining an estimated video quality of the video frame of the set of video frames based at least in part on an estimated video quality of a preceding video frame to the video frame of the set of video frames and a macroblock concealment value associated with the video frame; and determining that the estimated video quality of the video frame of the set of video frames fails to satisfy the video quality degradation threshold value, wherein rendering the video frame of the set of video frames comprises refraining from rendering the video frame of the set of video frames or one or more video frames subsequent to the video frame based at least in part on the estimated video quality of the video frame of the set of video frames failing to satisfy the video quality degradation threshold value.

14. The method of claim 13, wherein refraining from rendering the video frame of the set of video frames or the one or more video frames subsequent to the video frame comprises:

refraining from rendering the video frame of the set of video frames or the one or more video frames subsequent to the video frame until receiving a subsequent frame comprising an instantaneous decoder refresh frame or an error recovery predicted frame with or without carrying a recovery point supplemental enhancement information message as an indication.

15. The method of claim 1, wherein determining to render the video frame of the set of video frames comprises:

determining the video frame of the set of video frames comprises an instantaneous decoder refresh frame or an error recovery predicted frame with or without carrying a recovery point supplemental enhancement information message as an indication;

determining an estimated video quality of the video frame of the set of video frames based at least in part on a macroblock concealment value associated with the video frame; and determining that the estimated video quality of the video frame of the set of video frames fails to satisfy the video quality degradation threshold value, wherein rendering the video frame of the set of video frames comprises refraining from rendering the video frame of the set of video frames or one or more video frames subsequent to the video frame based at least in part on the estimated video quality of the video frame of the set of video frames failing to satisfy the video quality degradation threshold value.

16. The method of claim 15, wherein refraining from rendering the video frame of the set of video frames or the one or more video frames subsequent to the video frame comprises:

refraining from rendering the video frame of the set of video frames or the one or more video frames subsequent to the video frame until receiving a subsequent frame comprising an instantaneous decoder refresh frame or an error recovery predicted frame with or without carrying a recovery point supplemental enhancement information message as an indication.

17. An apparatus for video frame rendering, comprising:
a processor,
memory in electronic communication with the processor; and
instructions stored in the memory and executable by the processor to cause the apparatus to:
receive a set of video packets over a video connection;
generate a set of video frames based at least in part on the set of video packets;
determine to render a video frame of the set of video frames based at least in part on a frame type of the video frame or a rendering criteria comprising a video quality of the video frame, or both, wherein the frame type comprises a perfect frame or a corrupted frame;
identify a priority of the video quality of the set of video frames based at least in part on a user preference;
determine a video quality degradation threshold value based at least in part on the priority of the video quality;
render the video frame of the set of video frames based at least in part on the frame type of the video frame, the video frame satisfying the rendering criteria, or the video quality degradation threshold, or any combination thereof; and
output the rendered video frame for display.

18. The apparatus of claim 17, wherein the video quality degradation threshold value comprises a threshold range.

19. The apparatus of claim 17, wherein the instructions are executable by the processor to cause the apparatus to:
dynamically configure the video quality degradation threshold value based at least in part on the user preference.

20. An apparatus for video frame rendering, comprising:
means for receiving a set of video packets over a video connection;
means for generating a set of video frames based at least in part on the set of video packets;
means for determining to render a video frame of the set of video frames based at least in part on a frame type of the video frame or a rendering criteria comprising a video quality of the video frame, or both, wherein the frame type comprises a perfect frame or a corrupted frame;
means for identifying a priority of the video quality of the set of video frames based at least in part on a user preference;
means for determining a video quality degradation threshold value based at least in part on the priority of the video quality;
means for rendering the video frame of the set of video frames based at least in part on the frame type of the video frame, the video frame satisfying the rendering criteria, the video quality degradation threshold, or any combination thereof; and
means for outputting the rendered video frame for display.

* * * * *